US011127127B2

(12) United States Patent
Yang (10) Patent No.: US 11,127,127 B2
(45) Date of Patent: Sep. 21, 2021

(54) FULL-FIELD IMAGING LEARNING MACHINE (FILM)

(71) Applicant: UCHICAGO ARGONNE, LLC, Chicago, IL (US)

(72) Inventor: Yongchao Yang, Lemont, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 134 days.

(21) Appl. No.: 16/429,857

(22) Filed: Jun. 3, 2019

(65) Prior Publication Data

US 2020/0380658 A1   Dec. 3, 2020

(51) Int. Cl.
*G06T 7/00*   (2017.01)
*G06N 3/08*   (2006.01)
*G06N 3/04*   (2006.01)

(52) U.S. Cl.
CPC ......... *G06T 7/0002* (2013.01); *G06N 3/0445* (2013.01); *G06N 3/08* (2013.01); *G06T 2207/10016* (2013.01); *G06T 2207/10024* (2013.01); *G06T 2207/10028* (2013.01); *G06T 2207/10036* (2013.01);
(Continued)

(58) Field of Classification Search
CPC .................. G06N 3/0445; G06N 3/08; G06T 2207/10016; G06T 2207/10024; G06T 2207/10028; G06T 2207/10036; G06T 2207/10048; G06T 2207/10056; G06T 2207/10061; G06T 2207/10068;
(Continued)

(56) References Cited

U.S. PATENT DOCUMENTS 10,837,793 B2 *   11/2020   Roy Chowdhury .. B60W 40/06
2008/0154154 A1 *   6/2008   Sarvazyan ............... A61B 5/06
600/587
(Continued)

OTHER PUBLICATIONS

Hossain et al ; Md Sazzad Hossain, Ong Zhi Chao, Zubaidah Ismail, Siamak Noroozi, Khoo Shin Yee, Artificial Neural Networks for Vibration Based Inverse Parametric Identifications: A Review, Applied Soft Computing Journal http://dx.doi.org/10.1016/j.asoc.2016.12.014 (Year: 2017).*

(Continued)

*Primary Examiner* — Ian L Lemieux
(74) *Attorney, Agent, or Firm* — Marshall, Gerstein & Borun LLP (57) ABSTRACT

A method of determining dynamic properties of a structure (linear or nonlinear) includes receiving spatio-temporal inputs, generating mode shapes and modal components corresponding to the spatio-temporal inputs using a trained deep complexity coding artificial neural network, and subsequently generating the dynamic properties by analyzing each modal component using a trained learning machine. A computing system for non-contact determination of dynamic properties of a structure includes a camera, a processor, and a memory including computer-executable instructions. When the instructions are executed, the system is caused to receive spatio-temporal image data, decompose the spatio-temporal image data into constituent manifold components using an autoencoder, and analyze the constituent manifold components using a trained learning machine to determine the dynamic properties.

20 Claims, 4 Drawing Sheets

(52) U.S. Cl.
CPC ............... *G06T 2207/10048* (2013.01); *G06T 2207/10056* (2013.01); *G06T 2207/10061* (2013.01); *G06T 2207/10068* (2013.01); *G06T 2207/20081* (2013.01); *G06T 2207/20084* (2013.01); *G06T 2207/30184* (2013.01)

(58) Field of Classification Search
CPC . G06T 2207/20081; G06T 2207/20084; G06T 2207/30184; G06T 7/0002; G06T 7/20
See application file for complete search history.

(56) References Cited

U.S. PATENT DOCUMENTS

| | | | | |
|---|---|---|---|---|
| 2015/0195430 | A1* | 7/2015 | Wadhwa | H04N 5/144 348/581 |
| 2016/0247066 | A1* | 8/2016 | Yufik | G06N 3/0454 |
| 2016/0321384 | A1* | 11/2016 | Pal | B33Y 50/02 |
| 2018/0084195 | A1* | 3/2018 | Yang | H04N 21/234363 |
| 2019/0154872 | A1* | 5/2019 | Leduc | G06N 3/08 |
| 2019/0188482 | A1* | 6/2019 | Knittel | G06K 9/00744 |
| 2020/0175352 | A1* | 6/2020 | Cha | G06N 3/0454 |
| 2020/0334577 | A1* | 10/2020 | Anderson | G06N 5/003 |

OTHER PUBLICATIONS

Helfrick, Niezrecki and Avitabile, "3D Digital Image Correlation Methods for Full-Field Vibration Measurement," Mech. Syst. Signal Process, 25:917-927 (2011).

Olaszek, "Investigation of the Dynamic Characteristic of Bridge Structure Using a Computer Vision Method," Measurement, 25(1):227-236 (1999).

Wahbeh, Caffrey and Masri, "A Vision-Based Approach for the Direct Measurement of Displacements in Vibrating Systems," Smart Materials and Structures, 12(5):785-794 (2003).

Wang and Mottershead, "Finite Element Model Updating From Full-Field Vibration Measurement using Digital Image Correlation," Journal of Sound and Vibration, 330(8):1599-1620 (2011).

* cited by examiner

FULL-FIELD IMAGING LEARNING MACHINE (FILM)

This invention was made with government support under Contract No. DE-AC02-06CH11357 awarded by the United States Department of Energy to UChicago Argonne, LLC, operator of Argonne National Laboratory. The government has certain rights in the invention.

TECHNICAL FIELD

The present disclosure is generally directed to dynamic measurement and identification of linear or nonlinear physical structures and systems, in particular, estimating full-field structural dynamics properties based on analyzing imaging data using physics-incorporated machine learning models.

BACKGROUND

Known methods for measuring and characterizing structural dynamics are inadequate. Discrete-point contact-type sensing methods including accelerometers and strain gauges (e.g., image vibration measurement) can only be placed at a limited number of positions on a structure. Such contact-type sensing methods (e.g., digital image correlation) may require a priori affixing of physical reflectors and/or the application of proprietary contrast patterns (e.g., paint) to structures, before such structures may be observed/measured. Such reflectors/patterns are subject to ongoing monitoring and may be affected by environmental conditions (e.g., weather, wildlife, etc.) and may negatively affect building aesthetics. Further, such discrete-point contact-type sensing methods can only be placed at a limited number of positions at a structure, thus providing only low spatial resolution.

Existing non-contact methods, including laser-based vibrometers (e.g., LiDAR) perform time-consuming sequential point-by-point scanning measurement. Existing video-based methods are impractical due to processing bottlenecks caused by, inter alia, high spatial/pixel resolution. In some cases, processing only a handful of images may take many hours. Further, known methods may not enable analysis of nonlinear structures.

BRIEF SUMMARY

In one aspect, a computer-implemented method of determining a set of dynamic properties of a structure of interest may include receiving a set of spatio-temporal inputs, generating a set of modal components by analyzing the set of spatio-temporal inputs using a trained deep complexity coding artificial neural network, and generating the set of dynamic properties of the structure of interest by analyzing the set of modal components using a trained learning machine.

In another aspect, a computing system for non-contact determination of a set of dynamic properties of a structure of interest may include a camera, one or more processors, and a memory including a set of computer-executable instructions, wherein the set of computer-executable instructions, when executed by the one or more processors, cause the computing system to receive, via the camera, spatio-temporal image data, decompose the spatio-temporal image data into a set of modal components characterizing the full-field pixel-level structural properties of the structure of interest, by analyzing the spatio-temporal image data using an auto-encoder, and analyze the set of modal components using a trained learning machine to determine the set of dynamic properties.

In yet another aspect, a non-transitory computer readable medium contains program instructions that when executed cause a computer to receive, via the camera, spatio-temporal image data, decompose the spatio-temporal image data into a set of modal components characterizing the full-field pixel-level structural properties of the structure of interest, by analyzing the spatio-temporal image data using an auto-encoder, and analyze the constituent manifold components using a trained learning machine to determine the set of dynamic properties.

BRIEF DESCRIPTION OF THE FIGURES

The figures described below depict various aspects of the system and methods disclosed therein. It should be understood that each figure depicts one embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

The figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

Overview

The embodiments described herein relate to, inter alia, full-field super-resolved imaging learning machines. Specifically, one or more machine learning model (e.g., one or more artificial neural network (ANN)) may be used to train a computer to analyze image data (e.g., a digital image and/or video) to generate a high-spatial-resolution dynamic measurement (e.g., one million pixels or more) of a physical structure and/or system present in the image data. For example, a physical structure and/or system may include an aircraft, an engine, a rotor, a bridge, an infrastructure, a biological cell, etc.

Exemplary Computing Environment

Figure 1:
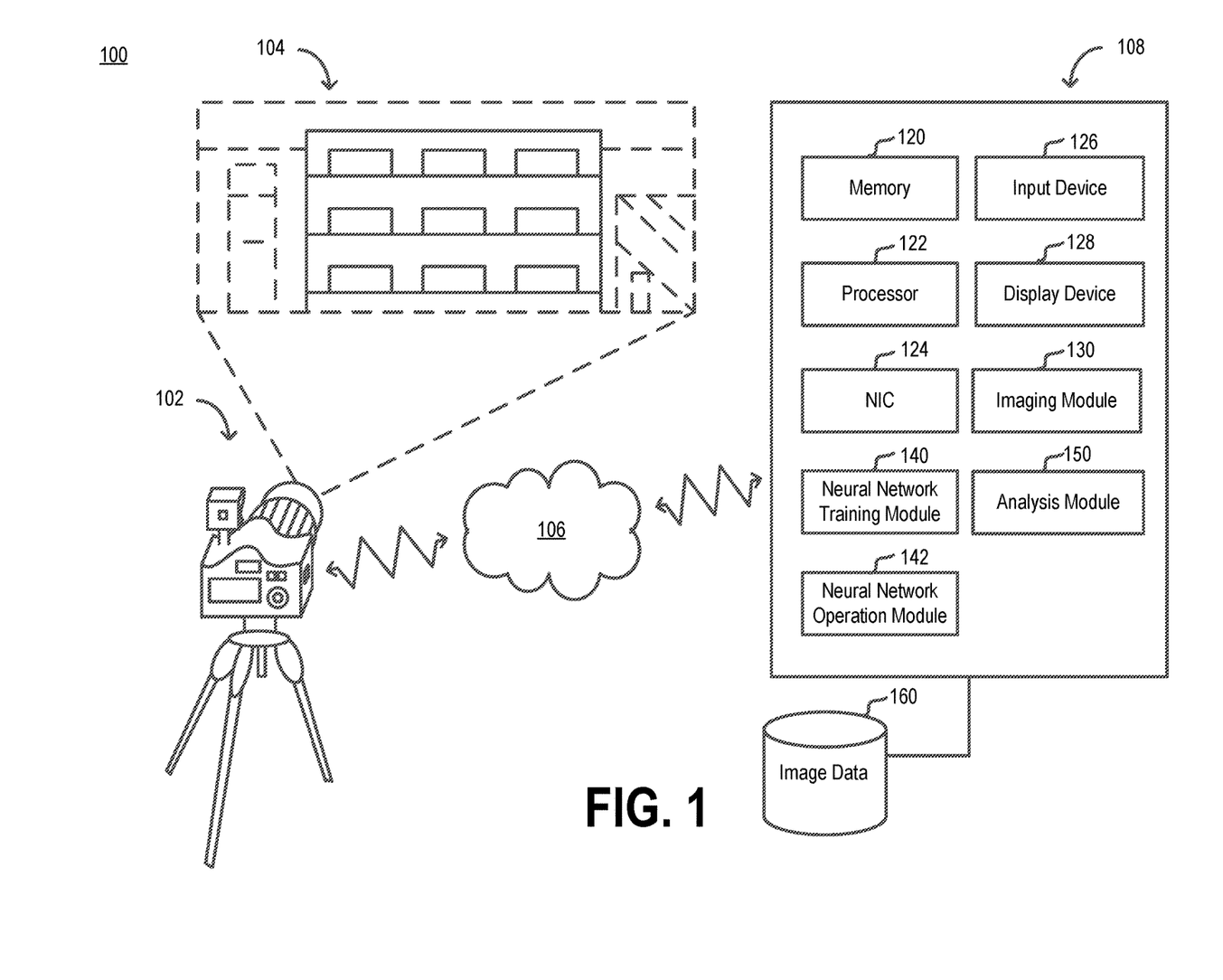
FIG. 1 depicts an exemplary computing environment in which structural analysis of image data is performed, according to one embodiment.

FIG. 1 depicts an exemplary computing environment 100 configured to perform full-field super-resolved imaging using machine learning models. Environment 100 may include a camera 102, a field 104, a network 106, and a computing device 108. The camera 102 may be communicatively coupled to the computing device 108 via the network 106 or directly embedded in the computing device 108.

The camera 102 may be any suitable device capable of capturing an image (e.g., a digital image) or a series/stream of images (e.g., a video). The camera 102 may be a commercially-available or purpose-built device. For example, the camera 102 may be a dedicated camera such as a full-frame complementary metal-oxide semiconductor (CMOS) mirror-less camera capable of high-resolution (e.g., 25 megapixel) image capture. In an embodiment, the camera 102 may be affixed to an autonomous or non-autonomous vehicle (e.g., an automobile, a drone, a robot, etc.). It should be appreciated that in some embodiments, the camera 102 may be a non-visible light device, such as an infrared thermography camera, or an acoustic/sonar camera. In such cases, the image data may include non-visible light data (e.g., ultrasound, infrared, etc.). Further, the camera 102 may capture image data at different scales (e.g., the camera 102 may be a video microscope).

The camera 102 may include a touch screen and/or physical interface (e.g., a button) for controlling camera settings such as light sensitivity (e.g., ISO), shutter speed, aperture, etc. The camera 102 may include one or more removable non-volatile memory device such as a secure digital (SD) memory card. The camera 102 may record photographs and/or video to the SD memory card. The SD memory card may be removable from the camera 102 and read by another device (e.g., the computing device 108) to allow retrieval of the recorded photographs and/or video. Generally, the camera 102 captures image data (e.g., still image data and/or video image data) corresponding to/representative of the field 104.

In FIG. 1, the field 104 depicts a structure of interest that is a three-story building. The field 104 may include one or more structure of interest. The structure of interest may be a linear or nonlinear structure. Depending on the embodiment and/or application of the techniques discussed herein, the field may include one or more environmental disturbance, also known herein as noise. For example, the field 104 may include environmental elements such as a street, one or more pedestrian, a waterline, a floodplain, a background or horizon, etc. The machine learning models disclosed herein (e.g., an ANN) may decompose nonstructural and structural components, and are thus robust in the presence of environmental disturbance/noise. For example, an ANN may be trained to distinguish between a structural oscillation and a non-structural motion, and to discard the non-structural motion. At micro or nano scales, the field 104 may include an environmental element such as a dish and/or a substrate. The structure of interest and the environmental elements may vibrate, and the camera 102 may capture image data corresponding to such vibrations. The camera 102 may capture full-field image data, including vibrations of both one or more structure of interest and the environmental elements.

In some embodiments, the camera 102 may be remote from the computing device 108 and linked via the network 106. In some embodiments, the camera 102 may include and/or be communicatively coupled to a network interface controller (NIC) that may transmit the recorded photographs and/or video via a wired/wireless connection to the network 106. The camera 102 may be coupled, physically and/or communicatively, to the computing device 108. In some embodiments, the camera 102 may be an integral part of the computing device 108. For example, the camera 102 may be a front-facing or rear-facing camera of a smart phone. In such cases, the camera 102 may communicate directly to the memory of the computing device 108, bypassing the network 106.

The network 106 may comprise any suitable network or networks, including a local area network (LAN), wide area network (WAN), Internet, or combination thereof. For example, the network 106 may include a wireless cellular service (e.g., 4G) allowing the camera 102 to stream video to the computing device 108 via a streaming media protocol (e.g., real-time streaming protocol). The network 106 may enable bidirectional communication between the camera 102 and other components of the environment 100 (e.g., the computing device 108).

The computing device 108 may be any suitable device (e.g., a laptop, a smart phone, a tablet, a wearable device, a blade server, etc.). The computing device 108 may include a memory 120 and a processor 122 for, respectively, storing and executing one or more modules. The memory 120 may include one or more suitable storage media such as a magnetic storage device, a solid-state drive, random access memory (RAM), etc. The processor 122 may include one or more suitable processors (e.g., central processing units (CPUs) and/or graphics processing units (GPUs)).

The computing device 108 may include a NIC 124, an input device 126, and a display device 128. The NIC 124 may include any suitable network interface controller(s), and may communicate over the network 106 via any suitable wired and/or wireless connection. The input device 126 may include one or more device for allowing a user to enter inputs (e.g., data) into with computing device 108. For example, the input device 126 may include a keyboard, a mouse, a microphone, a camera (e.g., the camera 102), etc.

The display device 128 may include any suitable device or devices for displaying output to a user. For example, the display device 128 may include a computer monitor, a tablet display screen, a smart phone display screen, a television, etc. The display device 128 and/or the input device 126 may include operating system-level software (e.g., a software driver) for facilitating communication between the input device 126, the display device 128, and the computing device 108. The input device 126 and/or the display device 128 may connect to the computing device 108 via any suitable wired or wireless protocols (e.g., Universal Serial Bus (USB), Bluetooth, etc.). In some embodiments, the input device 126 and the display device 128 may be integral to the computing device 108, such as in an embodiment including a capacitive touch screen that both accepts user inputs via a touch interface of a screen, and that displays outputs via the screen.

The one or more modules stored in the memory 120 and executed by the processor 122 may comprise respective sets of computer executable instructions. For example, FIG. 1 depicts an imaging module 130, an artificial neural network training module 140, an artificial neural network operation module 142, and an analysis module 150.

The imaging module 130 may include a set of computer-readable instructions for processing images. The imaging module 130 may perform pre-processing of raw image data, such as that produced by a digital camera. For example, the imaging module 130 may receive/retrieve image data from the camera 102 and convert/compress the data to and from various image formats (e.g., RAW, JPEG, PNG, GIF, etc.). The imaging module 130 may encode/decode to and from various video codecs/bitrates (e.g., 3ivx, Blackbird, Divx, FFmpeg, x264, etc.). The imaging module 130 may perform data operations with respect to image data, including resizing, blurring, cropping, despeckling, dithering, resampling, etc. In an embodiment, the imaging module 130 may act as a pass-through that routes raw image data to another module, such as the neural network operation module 142 for analysis using a machine learning module trained by the neural network training module 140. In some embodiments, the imaging module 130 may be implemented using a programming language (e.g., Python) and convert image data to a native data format (e.g., a time series, data frame, etc.).

The neural network training module 140 may train one or more model (e.g., an ANN), as discussed below. Once the neural network training module 140 has trained one or more ANN, the neural network operation module 142 may retrieve, load, deserialize, execute, and/or operate the one or more trained model. For example, the neural network operation module 142 may receive inputs (e.g., image data) from a module (e.g., from the imaging module 130), and may analyze the image data to produce a spatial characterization based on the image data, and subsequently a temporal/spectral characterization based on the outputs of the first neural network. In some embodiments, a first neural network may generate a spatial characterization based on the image data, while a second neural network generates a temporal/spectral characterization based on the outputs of the first neural network. The neural network operation module 142 may establish a network architecture, and manage the concurrent operation of one or more machine learning models.

Exemplary Artificial Neural Network Training

One or more training data sets may be used for model training in the present techniques, and the shape of the respective training data sets chosen based upon the physical properties of the system being modeled.

For example, an exemplary training data set corresponding to an over-complete system having four modes and free vibration may include many hundred (e.g., 250) examples having a plurality of channels and time steps (e.g., 12 channels and 1000 time steps) wherein the time steps range from zero to one second in 0.001-second increments. In the example, the input has shape (1000, 12). The input shape may affect the ANN network architecture, as discussed below. The elements of the training data set may comprise tensors scaled to small values (e.g., in the range of (−1.0, 1.0)). In another embodiment, a training data set corresponding to a non-consecutive Duffing system exhibiting cubic nonlinearity and free vibration may include a training data set having three channels and three (nonlinear) modes.

In some embodiments, full-field pixel-domain structural dynamic response may include latent high-spatial pixel dimension and low modal-order representation. In other words, a high dimensional pixel representation may be accompanied by a low number (e.g., three) of active modes. For example, a training data set input corresponding to an experimental model of a beam structure exhibiting free vibration may be modeled. In such cases, a preprocessing layer may be included in training (and operation) which applies principal component analysis (PCA) to the input image data. PCA may be applied during training to reduce dimensionality from a high number (e.g., 384×216) to a relatively smaller number (e.g., 12). A first benefit of a PCA transformation is linearity, allowing an inverse PCA to reconstruct the original high pixel dimension representation without losing high-dimensional spatial regarding structural vibration of an object of interest represented in the image data. A second benefit of reducing dimensionality via PCA is a substantial reduction in computational resources (e.g., memory and CPU cycles) required to train and/or analyze the image data.

In general, training an ANN may include establishing a network architecture, or topology, adding layers including activation functions for each layer (e.g., a "leaky" rectified linear unit (ReLU), softmax, hyperbolic tangent, etc.), loss function, and optimizer. In an embodiment, the ANN may use different activation functions at each layer, or as between hidden layers and the output layer. A suitable optimizer may include Adam and Nadam optimizers. In an embodiment, a different neural network type may be chosen (e.g., a recurrent neural network, a deep learning neural network, etc.). Training data may be divided into training, validation, and testing data. For example, 20% of the training data set may be held back for later validation and/or testing. In that example, 80% of the training data set may be used for training. In that example, the training data set data may be shuffled before being so divided. Data input to the artificial neural network may be encoded in an N-dimensional tensor, array, matrix, and/or other suitable data structure. In some embodiments, training may be performed by successive evaluation (e.g., looping) of the network, using training labeled training samples. The process of training the ANN may cause weights, or parameters, of the ANN to be created. The weights may be initialized to random values. The weights may be adjusted as the network is successively trained, by using one of several gradient descent algorithms, to reduce loss and to cause the values output by the network to converge to expected, or "learned", values. In an embodiment, a regression may be used which has no activation function. Therein, input data may be normalized by mean centering, and a mean squared error loss function may be used, in addition to mean absolute error, to determine the appropriate loss as well as to quantify the accuracy of the outputs. The data used to train the ANN may include image data. In some embodiments, multiple ANNs may be separately trained and/or operated. In some embodiments, the present techniques may include using a machine learning framework (e.g., TensorFlow, Keras, scikit-learn, etc.) to facilitate the training and/or operation of machine learning models.

Exemplary Self-Learning

In some embodiments, self-learning may be used to identify modal coordinates by using a complexity function defined as the temporal predictability in the loss function of the nonlinear neural network model using a set of structural dynamic response data. Such a nonlinear modeling method generalizes to nonlinear structural dynamics identification, compared to a baseline algorithm such as the reformulated generalized eigenvalue decomposition that is only applicable to linear structures.

Avoiding Overfitting Via Orthogonal Regularization

As discussed above, the present techniques may accept large input data sets such as high-dimensional image data having many pixels (e.g., one million or more pixels). A goal of the present techniques is to extract structural dynamic properties and response from the image data. An ANN may accept image data as input and directly output structural dynamic properties and response, such as mode of frequency of damping ratio, eigenvectors, etc. However, training such an ANN has the potential to result in an uninterpretable black box, wherein a user cannot predict what the ANN will output. The trained ANN may output non-useful information, and/or the training of the ANN may overfit on training data. Therefore, the present techniques may include applying orthogonal regularization during the training/fine-tuning stage to cause trained models to converge in a direction wherein structural dynamic information provided will not be overfit. Specifically, the present techniques include constraining an ANN during training by regularizing the ANN using physics-based terms. For example, because individual modes are known to be orthogonal, the present techniques may include using an orthogonal regularizer to guide an ANN performing spatial characterizations to converge to orthogonal outputs that include correct vibration modes. Similarly, the present techniques include using regularization to cause an ANN performing temporal/spectral characterizations to extract correct dynamic properties for individual modes.

Artificial Neural Network Architecture

Exemplary Autoencoder and Learning Machine

Figure 2:
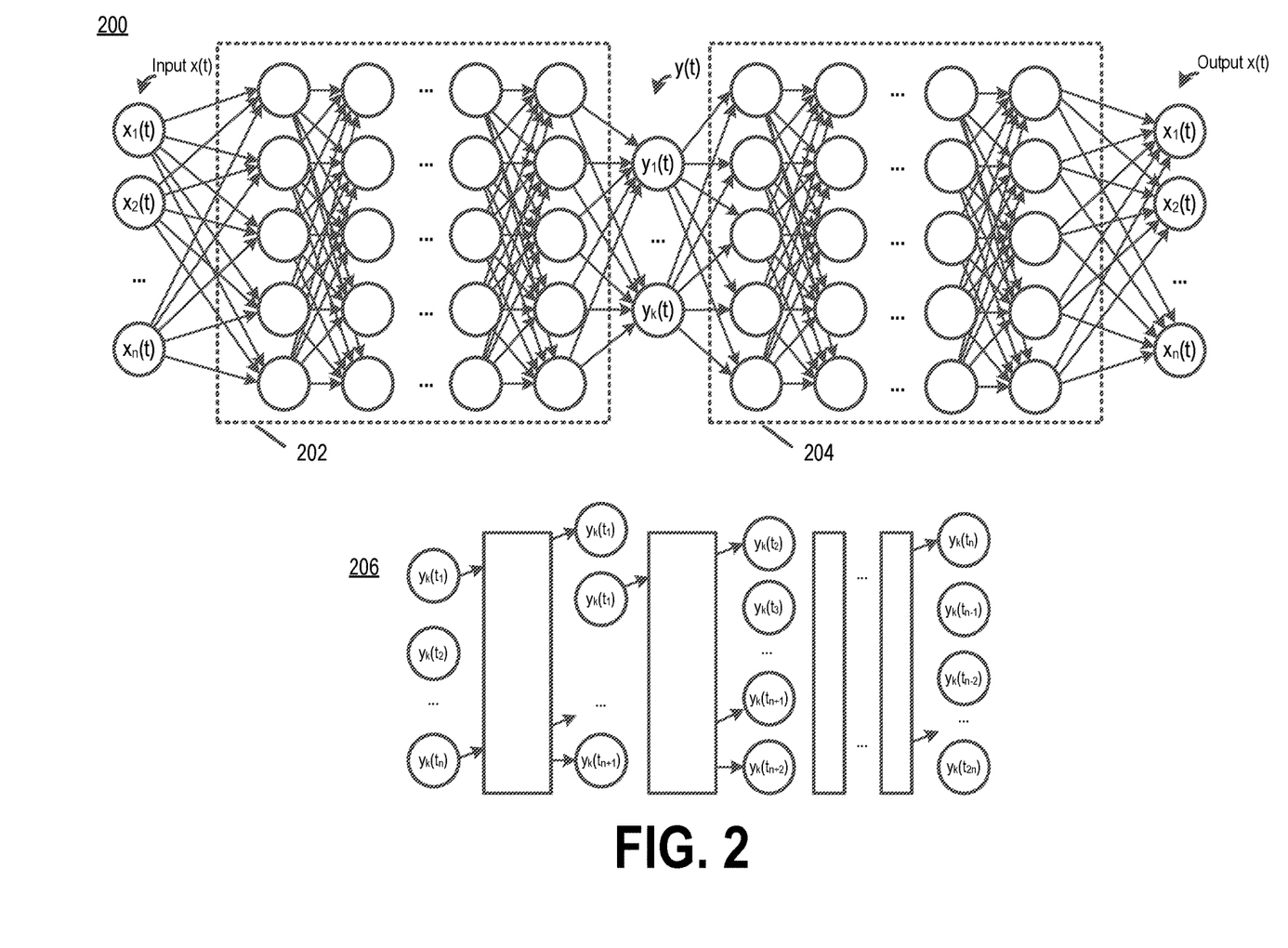
FIG. 2 depicts an exemplary autoencoder and learning machine.

FIG. 2 depicts a deep complexity coding artificial neural network autoencoder 200 and a deep independent system learning machine 206. The autoencoder 200 may have the form:

$$\varphi^{-1}((\varphi(x(t)))=x(t)$$

wherein the term $\varphi(x(t))$ is equivalent to $y(t)$. The autoencoder 200 may include an encoder 202 for encoding the input of $x(t_j)$ to constituent manifold components $y(t_j)=\varphi(x(t_j))$ and a decoder 204 for decoding $y(t_j)$ to recover input through $\tilde{x}(t_j)=\varphi^{-1}(y(t_j))$. The autoencoder 200 decomposes coupled spatio-temporal inputs (e.g., image data corresponding to a physical system) into constituent manifold components (modes) and dictionaries that characterize the full-field, pixel-level structural physical properties of the physical system.

The learning machine 206 learns the structural temporal and/or spectral properties of the de-coupled (e.g., single-degree-of-freedom) physical system by analyzing decomposed manifold components output by the learning machine 206. The learning machine 206 may be implemented as a long-short-time-memory recurrent neural network (LSTM-RNN). The learning machine 206 may learn a nonlinear autoregressive moving average model having exogenous inputs (e.g., a NARMAX model) that is capable of representing a wide family of nonlinear systems. The learning machine 206 may include a deep learning net for physical properties, having hidden layers that are LSTM-RNN, to learn the NARMAX model from the decomposed modal component $y_i(t)$.

The autoencoder 200 and the learning machine 206 may be tied to an underlying physical process/system. Specifically, as discussed above, the shape of training data used to train machine learning models in the present techniques may depend on the dynamic system being modeled. Similarly, a model's internal structure (architecture) may correspond to the shape of analysis data (e.g., image data).

Exemplary Full-Field Imaging Learning Machine

Figure 3:
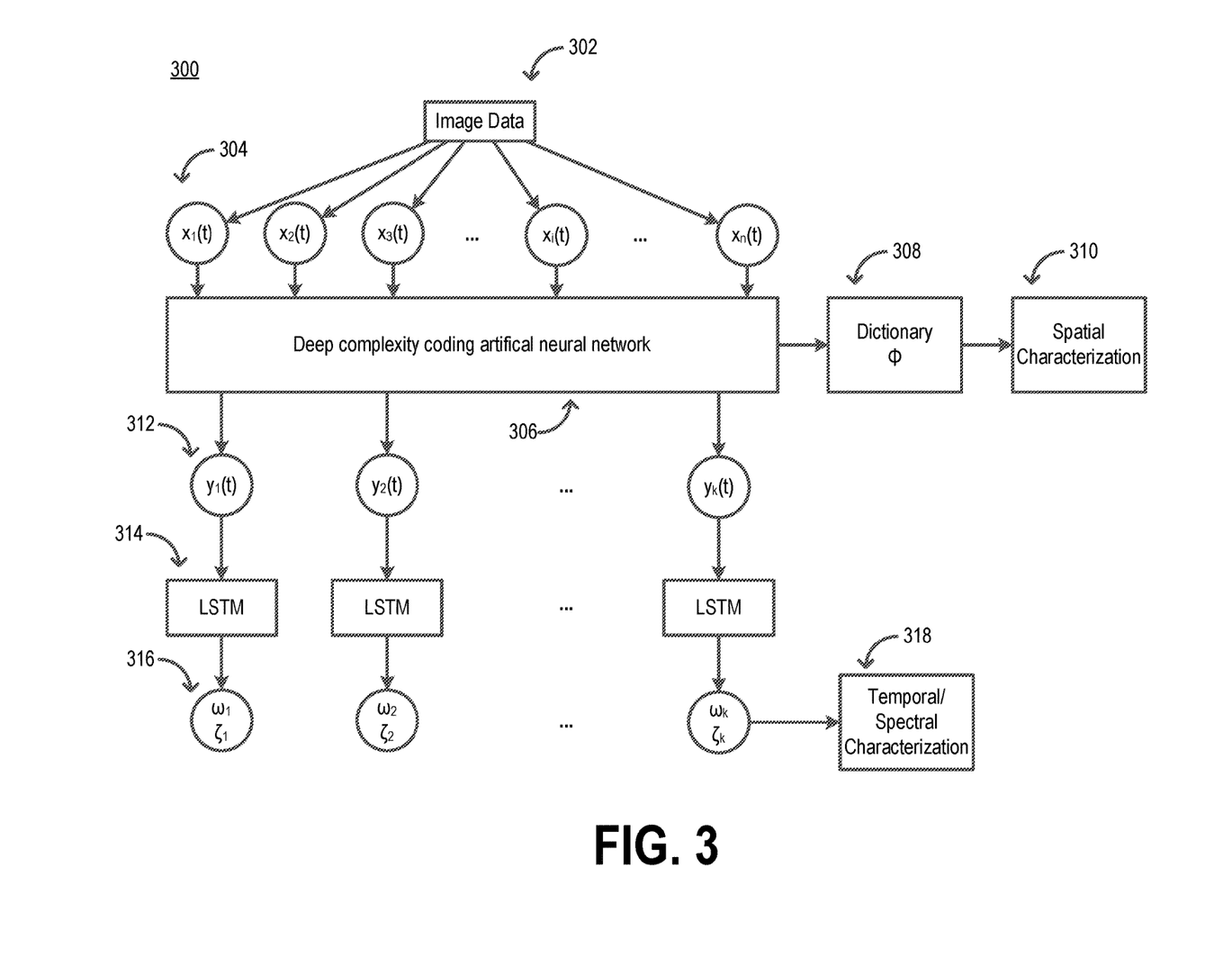
FIG. 3 depicts an exemplary full-field imaging composite artificial neural network, according to one embodiment.

FIG. 3 depicts an exemplary full-field imaging composite ANN 300. The composite ANN 300 depicts an image data set 302. The image data 302 set may correspond to a data set captured by the camera 102. For example, the image data set 302 may include an RGB-D data set, or an infrared data set, or a hyperspectral data set, or a data set of microscopic data, or a satellite data set, etc. The image data set 302 may include a set of spatio-temporal inputs 304 corresponding to image data (e.g., a video or still image) of a physical system. For example, the image data set may include three-dimensional image data, represented in a time series. As depicted, the spatio-temporal inputs 304 may be fed to the input layers of a deep complexity coding artificial neural network 306, having n total inputs 304, from $X_1$ to $X_n$, wherein n is a positive integer. The ANN 306 may correspond to the composition of the autoencoder 200 and the learning machine 206 of FIG. 2.

The composite ANN 300 may include layers of neurons, including a first input layer comprising the spatio-temporal inputs 304, the deep complexity coding artificial neural network 306, and one or more hidden layers. The spatio-temporal inputs 302 may comprise many inputs (e.g., one million or more inputs). In an embodiment, the number of input parameters may be chosen based on the number of pixels in an image and/or based on the dimension of an input image. An additional input may be added as a bias input. Each layer of the composite ANN 300 may include any number of neurons; i.e., n and k may be any positive integers. The number of parameters used in the hidden layers may be adjusted.

In some embodiments, X may be an array of pixels corresponding to a video at a time t. For example, in the depicted example, at t=0, a first set of pixels X comprise the spatio-temporal inputs 304. At each successive time in a time series, the deep complexity coding ANN 306 analyzes each of the pixels $X[1 \ldots n](t+1)$. The pixels X may correspond to the pixels of a high-resolution image, and the value of each pixel X may represent as an intensity value. The deep complexity coding ANN 306 may decompose the pixels X to output the dictionary (nonlinear mode shapes or invariant manifolds $\Phi$ and a plurality of modal components 312. Therefore, the deep complexity coding ANN 306 provides full-field pixel-level spatial mode vibration. Because the entire spatial field of an object is captured, each pixel is effectively an individual sensor, providing a very rich measurement. Analysis of high resolution data of image/video camera can infer the structure's dynamic properties and the health status of the structure. The output of the deep complexity coding ANN 306 may include modal coordinates 312 that are signals for a time response and a time history of each individual vibration mode.

The modal coordinates 312 may be inputs to a deep independent system learning machine. The deep independent system learning machine may include one or more long short-term memory artificial recurrent neural network (LSTM-RNN) 314 to explore temporal/spectral dynamics efficiently. The LSTM-RNN 314 may correspond to the learning machine 206 of FIG. 2. The LSTM-RNN 414 may identify a respective set of dynamic properties 316 relating to the structure that are time-varying or not time-invariant. For example, the dynamic properties 316 may include frequency and damping ratio. The LSTM-RNN 314 may learn these inherent structural properties from each of the modal coordinates 312. The LSTM-RNN 314 may process one or more inputs output by the deep complexity coding ANN 306 to generate a decision or other output. The LSTM-RNN 314 may output dynamic properties including modal frequency and damping ratio.

A module (e.g., the analysis module 150 of FIG. 1) may further analyze the dynamic properties to generate one or more temporal/spectral characterizations, such as fatigue analysis, aerodynamics, engine/rotor vibration, material characterization, etc. For example, in an embodiment, temporal/spectral information output by the LSTM-RNN 314 may be used to further characterize spectral-based dynamic behaviors. For example, the image data 302 may correspond to a cable of a suspension bridge. The deep complexity coding artificial neural network 306 may output a plurality of modes that are analyzed by the LSTM-RNN 314 to generate frequency information. A dynamic string equation may be used to calculate a cable force that characterize the fatigue status of the cable, and further infer the health status of the suspension bridge. In some embodiments, the vibration of a structure at modal frequencies may be used to quantify the force the structure is experiencing, and to infer a cause of fatigue damage.

Exemplary Applications of the Full-Field Imaging Learning Machine (FILM)

The practical applications of the deep complexity coding ANN and/or the LSTM-RNN techniques disclosed herein include structural health monitoring, damage detection, and defect localization. In some embodiments, the deep complexity coding ANN 306 may generate a dictionary 308 that includes spatial characteristics, such as the nonlinear modal shape of the structure in the image data 302, and structural geometry. An analysis component may use the dictionary 308 to further generate a spatial characterization 310 (e.g., structural health monitoring, high-fidelity model validation, full-field load identification, etc.). For example, an analysis component (e.g., the analysis module 150) may analyze the output of the ANN 306 to identify the location of structural damage by searching for an abnormal state (e.g., a vibrational singularity) in the shape of the structure, and then marking a corresponding defect. Specifically, due to the high spatial resolution of the present techniques, if the structure is damaged at a certain location, even in a very minor or small way, the change in shape can still be detected.

Further, once an abnormality is detected, the analysis component may continue to measure the structure's response, using learned properties to continuously update a computer model, such as a finite element model, with the current vibrational state of the structure. The analysis component may be used to implement continuous structural health monitoring of many structures, including engines, rotors, brakes, wind turbines, bridges, etc. The analysis component may analyze pixel-level high spatial resolution to quantify a structure's shape and sensitively locate small defects in materials of structure.

In an embodiment, the present techniques may include characterizing wave propagation in fluid dynamics. For example, a droplet of fluid may generate wave propagation. The camera 102 may capture image data corresponding to the wave propagation. An analysis module may analyze the image data using the deep complexity coding ANN 306 and the LSTM-RNN 314 to determine the dynamic properties of the fluid.

In real-world applications, many structures exhibit nonlinear behavior. The present techniques are therefore of great practical value. For example, a nonlinear relation may hold between applied forces (e.g., vibration) and displacements. Traditional analysis may not be used to analyze such relations. However, the present techniques may use the deep complexity coding ANN 306 to approximate the nonlinear functions and models by leveraging the universal nonlinear function approximating capability of the deep complexity coding ANN 306 to model and process nonlinear vibrations. Nonlinear structural modeling is very sensitive to the initial conditions of excitations. For example, the varying of amplitude of an impact to a structure exhibiting nonlinear behavior may cause the structure to behave very differently from impact to impact, and without a nonlinear model, predicting the behavior of the structure is impossible. The present techniques are applicable to this problem by enabling nonlinear modeling.

Advantageous Performance Over Baseline

In general, the present techniques outperform baseline methods (e.g., linear complexity pursuit method). Specifically, the present techniques advantageously outperform baseline methods in identifying nonlinear dynamic structures. In testing using both free and forced random vibration, the autoencoder correctly identifies modes (and conjugate eigenvalues) with respect to over-complete systems having four and/or twelve modes exhibiting free/random vibration. In regards to the non-conservative Duffing system exhibiting cubic nonlinearity and free vibration, the present techniques correctly identify the fundamental mode, and do not mix modal components as does linear complexity pursuit method. Further, the present techniques advantageously outperform baseline methods in the presence of real-world data, which is often noisy. With respect to a freely-vibrating experimental beam structure, the present techniques are shown to find modal coordinates more smoothly than linear complexity pursuit method, at nearly monotone frequency per source (modal component).

Exemplary Methods

Figure 4:
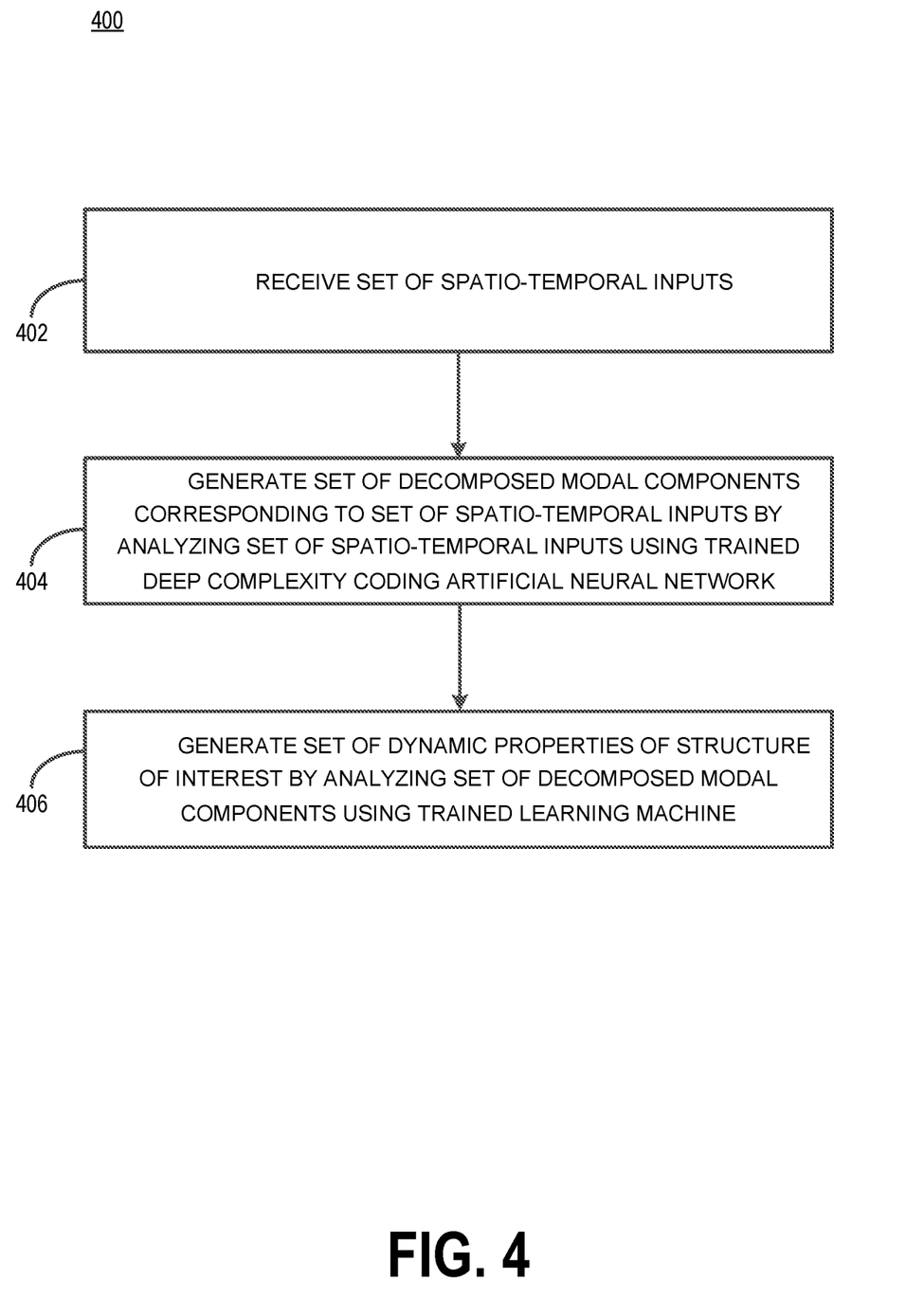
FIG. 4 depicts an exemplary method of full-field super-resolved imaging, according to an embodiment.

FIG. 4 depicts a method 400 of determining a set of dynamic properties of a structure of interest. The method 400 may include receiving a set of spatio-temporal inputs (block 402). The spatio-temporal inputs may be received/retrieved from a camera such as the camera 102 discussed in FIG. 1. The spatio-temporal inputs may include, for example, a set of pixels corresponding to each respective pixel in an image. The method 400 may include receiving/retrieving the pixels via a network, such as the network 106. In some embodiments, the spatio-temporal inputs may be received/retrieved directly from memory (e.g., from the memory of the camera 106). In an embodiment, the spatio-temporal inputs may include a video stream. The method 400 may include preprocessing the spatio-temporal inputs as discussed herein. The spatio-temporal inputs may correspond to, for example, the image data 302 of FIG. 3.

The method 400 may further include generating a set of mode shapes and modal components by analyzing the set of spatio-temporal inputs using a trained deep complexity coding artificial neural network (block 404). The mode shapes may correspond to different modes having respective frequencies (e.g., Mode 1—6.34 Hz, Mode 2—17.96 Hz, Mode 3—25.89 Hz, etc.). The trained deep complexity coding artificial neural network may correspond to the autoencoder 200 of FIG. 2, or the deep complexity coding artificial neural network 306 of FIG. 3.

The method 400 may further include generating the set of dynamic properties of the structure of interest by analyzing each modal component using a trained learning machine (block 406). The method 400 includes the physics-informed learning rule that each physically-possible signal is a mixture of simpler, constituent source signals, each of which is generated by the motion of mass and can be expressed in the fundamental laws of physics. By analyzing the decomposed modal coordinates, the method 400 identifies latent physical features (i.e., temporal/spectral properties). Each pixel of the image data is analyzed/measured simultaneously. When implemented as an LSTM-RNN, the trained learning machine maintains state information over time.

Embodiments of the techniques described in the present disclosure may include any number of the following aspects, either alone or combination:

1. A computer-implemented method of determining a set of dynamic properties of a structure of interest, the method comprising: receiving a set of spatio-temporal inputs, generating a set of decomposed modal components corresponding to the set of spatio-temporal inputs by analyzing the set of spatio-temporal inputs using a trained deep complexity coding artificial neural network, and generating the set of dynamic properties of the structure of interest by analyzing the decomposed modal components using a trained learning machine.

2. The computer-implemented method of aspect 1, wherein the set of spatio-temporal inputs includes RGB-D, infrared, hyperspectral, microscopic, satellite, and/or any types of video data.

3. The computer-implemented method of aspect 1, wherein the set of spatio-temporal inputs correspond to each pixel in an image at a time step t.

4. The computer-implemented method of aspect 1, further comprising: generating a dictionary including a full-field, pixel-level spatial characterization of the structure of interest.

5. The computer-implemented method of aspect 4, further comprising: determining a health of the structure of interest based on the full-field, pixel-level spatial characterization of the structure of interest.

6. The computer-implemented method of aspect 1, further comprising: determining, based on the set of decomposed modal components, a temporal/spectral characterization.

7. The computer-implemented method of aspect 6, further comprising using the herein the temporal/spectral characterization for a fatigue analysis, an aerodynamics analysis, an engine/rotor vibration analysis, or a material characterization.

8. The computer-implemented method of aspect 1, wherein the trained learning machine is a long short-term memory recurrent neural network.

9. The computer-implemented method of aspect 1, wherein the spatio-temporal input corresponds to video image data, and the steps are repeated for each time step t of the video image data.

10. A computing system for non-contact determination of a set of dynamic properties of a structure of interest, comprising: a camera, one or more processors, a memory including computer-executable instructions that, when executed, cause the computing system to: receive, via the camera, spatio-temporal image data, decompose the spatio-temporal image data into constituent manifold components characterizing the full-field pixel-level structural properties of the structure of interest, by analyzing the spatio-temporal image data using an autoencoder, and analyze the constituent manifold components using a learning machine to determine the set of dynamic properties.

11. The computing system of aspect 10, wherein the camera is a digital camera, digital video camera, a microscope, a scanning electronic microscope, an endoscope, a sonar device, or an infrared thermography camera.

12. The computing system of aspect 10, the memory including further computer-executable instructions that, when executed, cause the computing system to: generate a dictionary including a full-field, pixel-level spatial characterization of the structure of interest.

13. The computing system of aspect 10, the memory including further computer-executable instructions that, when executed, cause the computing system to: determine a health of the structure of interest based on the full-field, pixel-level spatial characterization of the structure of interest.

14. The computing system of aspect 10, the memory including further computer-executable instructions that, when executed, cause the computing system to: determine, based on the set of decomposed modal components, a temporal/spectral characterization.

15. The computing system of aspect 10, wherein the trained learning machine is a long short-term memory recurrent neural network.

16. A non-transitory computer readable medium containing program instructions that when executed, cause a computer to: receive, via a camera, spatio-temporal image data, decompose the spatio-temporal image data into constituent manifold components characterizing the full-field pixel-level structural properties of the structure of interest, by analyzing the spatio-temporal image data using an autoencoder, and analyze the constituent manifold components using a learning machine to determine the set of dynamic properties.

17. The non-transitory computer readable medium of aspect 16, containing further program instructions that when executed, cause a computer to: generate a dictionary including a full-field, pixel-level spatial characterization of the structure of interest.

18. The non-transitory computer readable medium of aspect 16, containing further program instructions that when executed, cause a computer to: determine a health of the structure of interest based on the full-field, pixel-level spatial characterization of the structure of interest.

19. The non-transitory computer readable medium of aspect 16, containing further program instructions that when executed, cause a computer to: determine, based on the set of decomposed modal components, a temporal/spectral characterization.

20. The non-transitory computer readable medium of aspect 16, wherein the trained learning machine is a long short-term memory recurrent neural network.

Additional Considerations

With the foregoing, users whose data is being collected and/or utilized may first opt-in. After a user provides affirmative consent, data may be collected from the user's device (e.g., a mobile computing device). In other embodiments, deployment and use of neural network models at a client or user device (e.g., the camera 102 of FIG. 1) may have the benefit of removing any concerns of privacy or anonymity, by removing the need to send any personal or private data to a remote server (e.g., the computing device 108 of FIG. 1).

The following additional considerations apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory product to which it is communicatively coupled. A further hardware module may then, at a later time, access the memory product to retrieve and process the stored output. Hardware modules may also initiate communications with input or output products, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a building environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a building environment, an office environment, or a server farm). In other example embodiments, the one or more processors or processor-implemented modules may be distributed across a number of geographic locations.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Upon reading this disclosure, those of skill in the art will appreciate still additional alternative structural and functional designs for the method and systems described herein through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A computer-implemented method of determining a set of nonlinear dynamic properties of a structure of interest, the method comprising:
   receiving a set of spatio-temporal inputs,
   generating a set of decomposed nonlinear modal components corresponding to the set of spatio-temporal inputs by analyzing the set of spatio-temporal inputs using a trained deep complexity coding artificial neural network, and
   generating the set of nonlinear dynamic properties of the structure of interest by analyzing the set of decomposed nonlinear modal components using a trained learning machine.

2. The computer-implemented method of claim 1, wherein the set of spatio-temporal inputs includes RGB-D, infrared, hyperspectral, microscopic, satellite, and/or other types of video data.

3. The computer-implemented method of claim 1, wherein the set of spatio-temporal inputs correspond to each pixel in an image at a time step t.

4. The computer-implemented method of claim 1, further comprising:
   generating a dictionary including a full-field, pixel-level spatial characterization of the structure of interest.

5. The computer-implemented method of claim 4, further comprising:
   determining a health of the structure of interest based on the full-field, pixel-level spatial characterization of the structure of interest.

6. The computer-implemented method of claim 1, further comprising:
   determining, based on the set of decomposed nonlinear modal components, a temporal/spectral characterization.

7. The computer-implemented method of claim 6, further comprising:
   using the temporal/spectral characterization for a fatigue analysis, an aerodynamics analysis, an engine/rotor vibration analysis, or a material characterization.

8. The computer-implemented method of claim 1, wherein the trained learning machine is a long short-term memory recurrent neural network.

9. The computer-implemented method of claim 1, wherein the spatio-temporal input corresponds to video image data.

10. A computing system for non-contact determination of a set of nonlinear dynamic properties of a structure of interest, comprising:
    a camera,
    one or more processors,
    a memory including computer-executable instructions that, when executed, cause the computing system to:
    receive, via the camera, spatio-temporal image data,
    decompose the spatio-temporal image data into a set of decomposed nonlinear modal components characterizing the full-field pixel-level structural properties of the structure of interest, by analyzing the spatio-temporal image data using an autoencoder, and
    analyze the set of decomposed nonlinear modal components using a trained learning machine to determine the set of nonlinear dynamic properties.

11. The computing system of claim 10, wherein the camera is a digital camera, digital video camera, a microscope, a scanning electronic microscope, an endoscope, a sonar device, or an infrared thermography camera.

12. The computing system of claim 10, the memory including further computer-executable instructions that, when executed, cause the computing system to:
    generate a dictionary including a full-field, pixel-level spatial characterization of the structure of interest.

13. The computing system of claim 10, the memory including further computer-executable instructions that, when executed, cause the computing system to:
    determine a health of the structure of interest based on the full-field, pixel-level spatial characterization of the structure of interest.

14. The computing system of claim 10, the memory including further computer-executable instructions that, when executed, cause the computing system to:
    determine, based on the set of decomposed nonlinear modal components, a temporal/spectral characterization.

15. The computing system of claim 10, wherein the trained learning machine is a long short-term memory recurrent neural network.

16. A non-transitory computer readable medium containing program instructions that when executed, cause a computer to:
    receive, via a camera, spatio-temporal image data,
    decompose the spatio-temporal image data into a set of nonlinear modal components characterizing the full-field pixel-level structural properties of the structure of interest, by analyzing the spatio-temporal image data using an autoencoder, and
    analyze the set of decomposed nonlinear modal components using a trained learning machine to determine the set of nonlinear dynamic properties.

17. The non-transitory computer readable medium of claim 16, containing further program instructions that when executed, cause a computer to:
    generate a dictionary including a full-field, pixel-level spatial characterization of the structure of interest.

18. The non-transitory computer readable medium of claim 16, containing further program instructions that when executed, cause a computer to:
    determine a health of the structure of interest based on the full-field, pixel-level spatial characterization of the structure of interest.

19. The non-transitory computer readable medium of claim 16, containing further program instructions that when executed, cause a computer to:
   determine, based on the set of decomposed nonlinear modal components, a temporal/spectral characterization.

20. The non-transitory computer readable medium of claim 16, wherein the trained learning machine is a long short-term memory recurrent neural network.

* * * * *